United States Patent
Zhang et al.

(10) Patent No.: US 12,506,399 B2
(45) Date of Patent: Dec. 23, 2025

(54) HYBRID LINEAR-BOOST DC-DC CONVERTER WITH CONTINUOUS INPUT CURRENT REGULATION

(71) Applicant: Analog Devices, Inc., Wilmington, MA (US)

(72) Inventors: Bin Zhang, Grass Valley, CA (US); Hua Chen, Santa Clara, CA (US); Min Chen, Fremont, CA (US)

(73) Assignee: Analog Devices, Inc., Wilmington, MA (US)

( * ) Notice: Subject to any disclaimer, the term of this patent is extended or adjusted under 35 U.S.C. 154(b) by 945 days.

(21) Appl. No.: 17/656,362

(22) Filed: Mar. 24, 2022

(65) Prior Publication Data

US 2023/0155475 A1    May 18, 2023

Related U.S. Application Data

(60) Provisional application No. 63/279,953, filed on Nov. 16, 2021.

(51) Int. Cl.
| | |
|---|---|
| *H02M 1/00* | (2007.01) |
| *H02J 7/00* | (2006.01) |
| *H02J 7/34* | (2006.01) |
| *H02M 3/158* | (2006.01) |

(52) U.S. Cl.
CPC ....... *H02M 1/0045* (2021.05); *H02J 7/00712* (2020.01); *H02J 7/345* (2013.01); *H02M 1/0009* (2021.05); *H02M 3/158* (2013.01); *H02J 2207/20* (2020.01); *H02J 2207/50* (2020.01)

(58) Field of Classification Search
CPC .. H02M 1/0045; H02M 1/0009; H02M 3/158; H02M 1/007; H02J 7/00712; H02J 7/345; H02J 2207/20; H02J 2207/50
See application file for complete search history.

(56) References Cited

U.S. PATENT DOCUMENTS

| | | | |
|---|---|---|---|
| 5,191,278 A | 3/1993 | Carpenter et al. | |
| 6,166,527 A | 12/2000 | Dwelley et al. | |
| 7,466,082 B1 * | 12/2008 | Snyder | H05B 45/38 |
| | | | 315/307 |
| 7,609,042 B2 | 10/2009 | Kokubun et al. | |
| 8,159,091 B2 | 4/2012 | Yeates | |
| 8,274,267 B2 | 9/2012 | Grimm | |
| 8,400,131 B2 | 3/2013 | Li et al. | |
| 9,077,198 B2 | 7/2015 | Szepesi | |

(Continued)

FOREIGN PATENT DOCUMENTS

CN    102969765 B    6/2015

*Primary Examiner* — Nha T Nguyen

(74) *Attorney, Agent, or Firm* — Schwegman Lundberg & Woessner, P.A.

(57) ABSTRACT

An apparatus comprising a regulator circuit that includes a linear input current regulating circuit configured to regulate input current to the regulator circuit when an output voltage of the regulator circuit is less than an input voltage of the regulator circuit; and a switching regulating circuit configured to regulate the input current when the output voltage is greater than the input voltage and less than a target regulated output voltage and regulate the output voltage when the output voltage reaches the target regulated output voltage. The linear input current regulating circuit is also used to disconnect the input from output during shutdown.

20 Claims, 6 Drawing Sheets

(56) References Cited

U.S. PATENT DOCUMENTS

| | | |
|---|---|---|
| 9,130,468 B2 | 9/2015 | Xu |
| 9,405,309 B2 | 8/2016 | Biziitu et al. |
| 9,473,023 B2 | 10/2016 | Vannorsdel et al. |
| 10,020,742 B2 | 7/2018 | Werner et al. |
| 10,044,263 B2 | 8/2018 | Kumar |
| 10,411,599 B1 | 9/2019 | Shi et al. |
| 11,137,790 B2* | 10/2021 | Ripley ................ G05F 5/00 |
| 2009/0285003 A1 | 11/2009 | Ishii |
| 2011/0221412 A1* | 9/2011 | Li ...................... H05B 45/38 |
| | | 323/283 |
| 2014/0091724 A1* | 4/2014 | Palmer ............. H05B 45/375 |
| | | 307/130 |
| 2014/0167842 A1* | 6/2014 | Chen ..................... H03F 3/24 |
| | | 330/127 |
| 2016/0254745 A1* | 9/2016 | Lim ................ H01L 25/0652 |
| | | 327/540 |
| 2017/0117730 A1* | 4/2017 | Kim ................. H02J 7/00712 |
| 2018/0129234 A1* | 5/2018 | Melgar ............. H02M 3/1588 |
| 2020/0076294 A1* | 3/2020 | Shlomo ........... H02M 3/33507 |
| 2020/0142436 A1* | 5/2020 | Chang ................ G05F 1/575 |
| 2020/0243119 A1* | 7/2020 | Spica .............. G06F 11/0727 |
| 2020/0321867 A1* | 10/2020 | Radecker ............ H02M 3/156 |
| 2021/0075214 A1* | 3/2021 | Schaevitz ........... H02M 3/156 |
| 2022/0393593 A1* | 12/2022 | Fukushima ............ H02M 1/08 |

* cited by examiner

HYBRID LINEAR-BOOST DC-DC CONVERTER WITH CONTINUOUS INPUT CURRENT REGULATION

CLAIM OF PRIORITY

This application claims priority to U.S. Provisional Application Ser. No. 63/279,953, filed Nov. 16, 2021, which is incorporated by reference herein in its entirety.

BACKGROUND

Many electronic circuits have a power profile with a pulsating waveform. Some examples include light emitting diode (LED) drivers such as for camera flash or machine vision, audio amplifiers, or RF power amplifiers. The power profiles include one or more bursts of high current for a short period of time followed by a long period of hibernation or very low current. This results in power profiles with low average power, but high peak power.

To deliver a pulsating waveform to a load, an electronic system can include a boost converter to charge up an energy buffer that provides a burst of energy to the load and only average power is sourced from the energy input. However, a simple boost converter cannot handle a situation where an output voltage is lower than an input voltage, such as may occur when the energy buffer provides a burst of energy to the load. This can result in surging input current that may damage system components and cause the system to fail. A buck-boost converter can be used to address this problem, but a buck-boost converter has discontinuous input current, which needs extra filtering and may worsen electro-magnetic interference (EMI) in the system.

OVERVIEW

This document relates generally to switching regulators and methods of their operation. An apparatus example includes a regulator circuit. The regulator circuit includes a linear input current regulating circuit configured to regulate input current to the regulator circuit when an output voltage of the regulator circuit is less than an input voltage of the regulator circuit, and a switching regulating circuit configured to regulate the input current when the output voltage is greater than the input voltage and less than a target regulated output voltage and regulate the output voltage when the output voltage reaches the target regulated output voltage.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Some electronic circuits have a pulsating waveform as a power profile. The circuits provide a burst of high current for a short time duration followed by low current for a long time duration until the next burst. The energy source for such electronic circuits may have limited instantaneous power capability. For example, a Universal Serial Bus (USB) charger has a current limit, or the output current of a battery pack is limited by its internal impedance as well as over-current protection. For this reason, an energy buffer may be used to provide the peak power to the electronic circuits, and the energy source provides an average power to the electronic circuits. An example of an energy buffer is a capacitor. Because the energy stored in a capacitor is proportional to the square of voltage, operating the capacitor at higher voltage can minimize the size and cost of the system.

Figure 1:
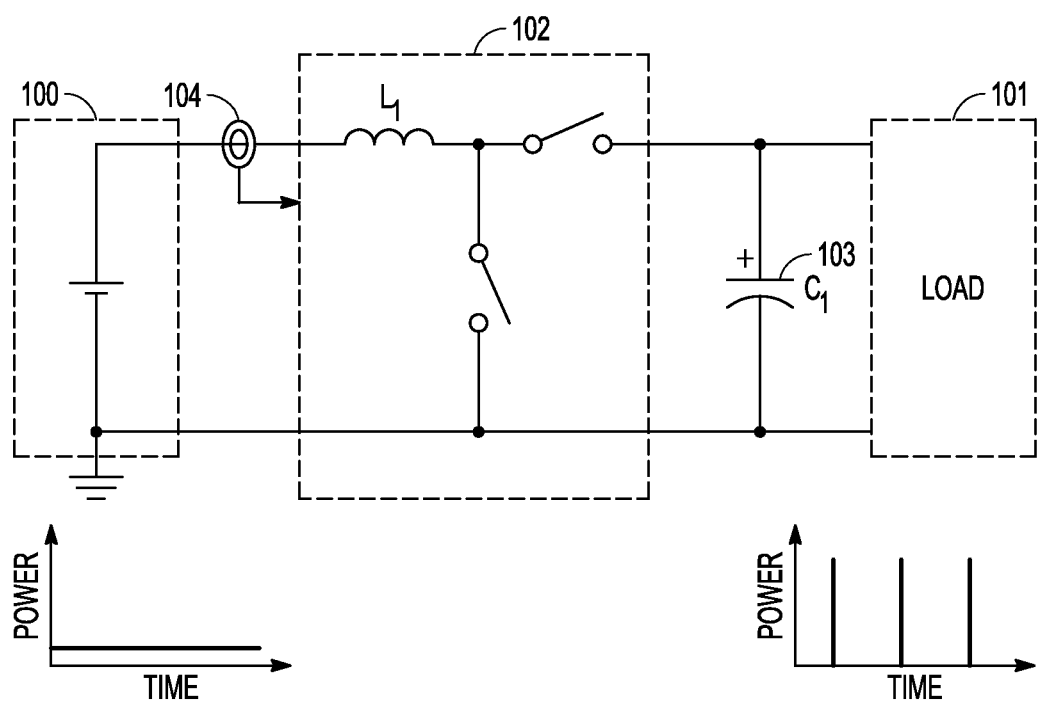
FIG. 1 is a circuit diagram of a boost converter.

FIG. 1 is a circuit diagram of a boost converter or step-up converter. A boost converter generates an output voltage higher than the input voltage to the boost converter. A boost converter 102 can be used to charge an energy buffer capacitor 103. The boost converter 102 charges the energy buffer capacitor 103 until the capacitor voltage reaches the target. After the load 101 discharges the capacitor 103, the boost converter will charge the capacitor again. However, a boost converter only functions when the output voltage is greater than the input voltage. When the output voltage is lower than the input voltage, the input current can no longer be controlled. For example, a large energy buffer capacitor with voltage lower than the input voltage may be suddenly connected to the output of the boost converter (hot plug connect). In further examples, the load connected to the energy buffer capacitor may discharge the energy buffer capacitor to a voltage lower than the input voltage, or a system fault may short the energy buffer capacitor to ground. In these example scenarios, the input energy source 100 will experience large surging current, which may cause catastrophic failure.

Figure 2:
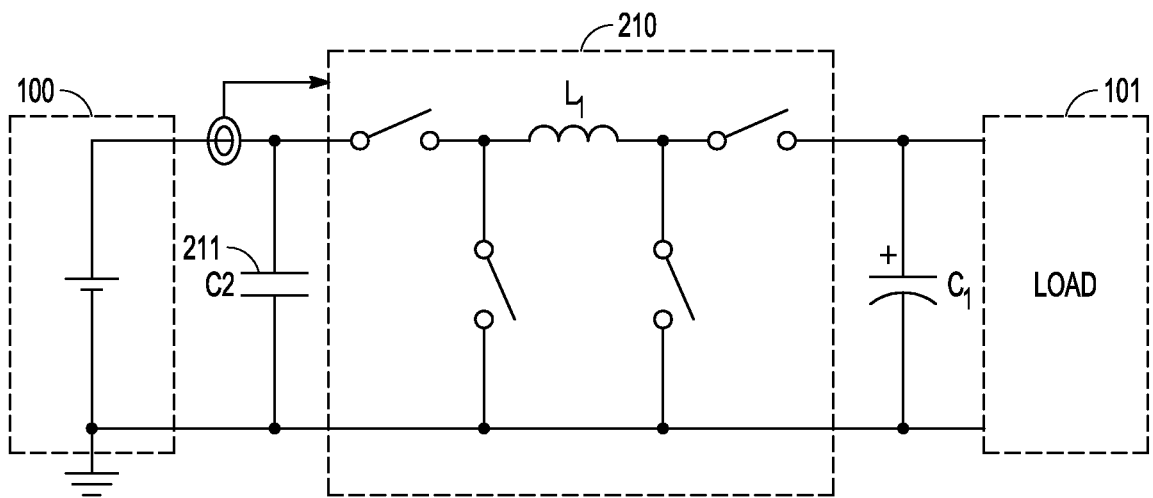
FIG. 2 is a circuit diagram of a buck-boost converter.

FIG. 2 is a circuit diagram of a four-switch non-inverting buck-boost converter 210. The buck-boost converter 210 cascades a step-down (buck) stage before the step-up stage. However, combining the buck stage with the boost converter into a buck-boost converter results in a much more complex system. Additionally, the input current of a buck converter or a buck-boost converter is discontinuous when the output voltage is lower than input, which causes a choppy current input to the converter. Large filter capacitors 211 or input electro-magnetic interference (EMI) filters can be used to smooth out the chopping current, but the buck-boost converter 210 still adds to EMI of the system.

Figure 3:
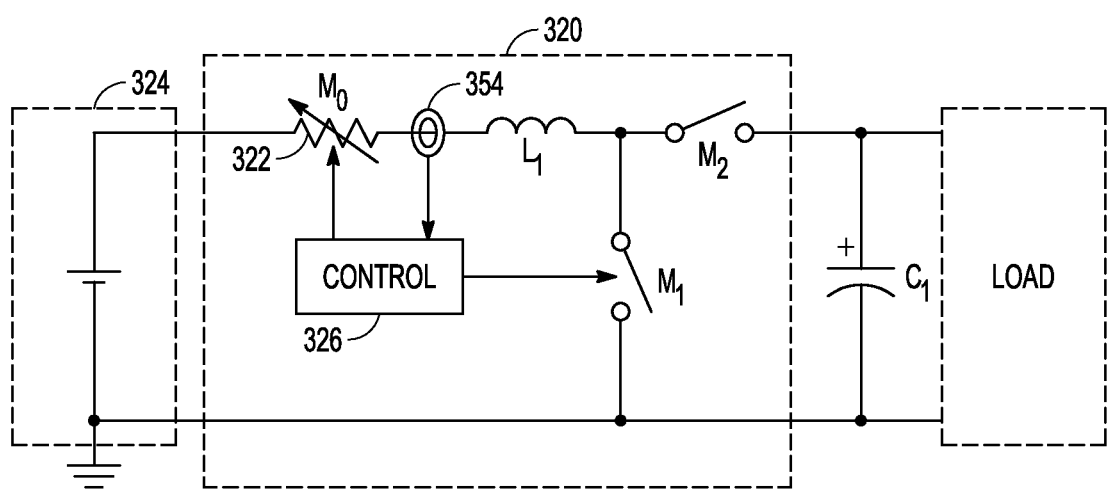
FIG. 3 is a circuit diagram of an example of a regulator circuit.

FIG. 3 is a circuit diagram of an example of a regulator circuit that can be used to charge an energy buffer capacitor. The regulator circuit 320 has a hybrid linear-boost dc-dc converter circuit topology. The regulator circuit 320 is a combination of a linear input current regulating circuit and an output voltage regulating circuit. The linear input current regulating circuit includes a pass transistor 322 ($M_O$) and the output regulating circuit includes a boost converter circuit. The boost converter circuit includes inductor $L_1$ and switching transistors $M_1$ and $M_2$. The boost converter circuit regulates the output voltage on output capacitor C1 when the output voltage is greater than the input voltage provided by an energy source 324. The linear input current regulating circuit resolves the problem with a simple boost converter approach by using pass transistor $M_O$ to regulate input current to the regulator circuit when the output voltage is less than the input voltage. The pass transistor $M_O$ is positioned at the input of the boost converter. $M_O$ can be a field effect transistor (FET). In certain examples, $M_O$ can be an n-type metal oxide semiconductor (NMOS) transistor or a p-type metal oxide semiconductor (PMOS) transistor.

The regulator circuit 320 includes a control circuit 326 to control both the pass transistor $M_O$ and the boost converter circuit. When the output voltage is lower than input, the pass transistor $M_O$ acts as a linear current regulator that provides a constant input current to charge the output capacitor $C_1$. In this linear regulator mode, the boost converter circuit is in a pass-through mode, where high side transistor $M_2$ is fully on and low side transistor $M_1$ is fully off. When $C_1$ charges and the output voltage is equal to or greater than the input voltage, the pass transistor $M_O$ is fully on and acts as a current sensing element. The boost converter charges the output capacitor with constant input current, until the output voltage reaches the target level. The boost converter circuit can operate either synchronously or non-synchronously. When a fault condition occurs, the pass transistor $M_O$ can completely turn off to isolate the circuit output from the circuit input in a shutdown mode.

Compared to using just a boost converter, the regulator circuit 320 regulates input current to the regulator circuit when the output voltage is less than the input voltage. To accurately regulate the input current, the regulator circuit 320 includes a current sensing circuit 354. Compared to using a buck-boost converter, the hybrid the regulator circuit 320 always has a continuous rather than a choppy input current. This hybrid linear-boost architecture approach of FIG. 3 provides a complete solution that is robust and highly integrated.

Figure 4:
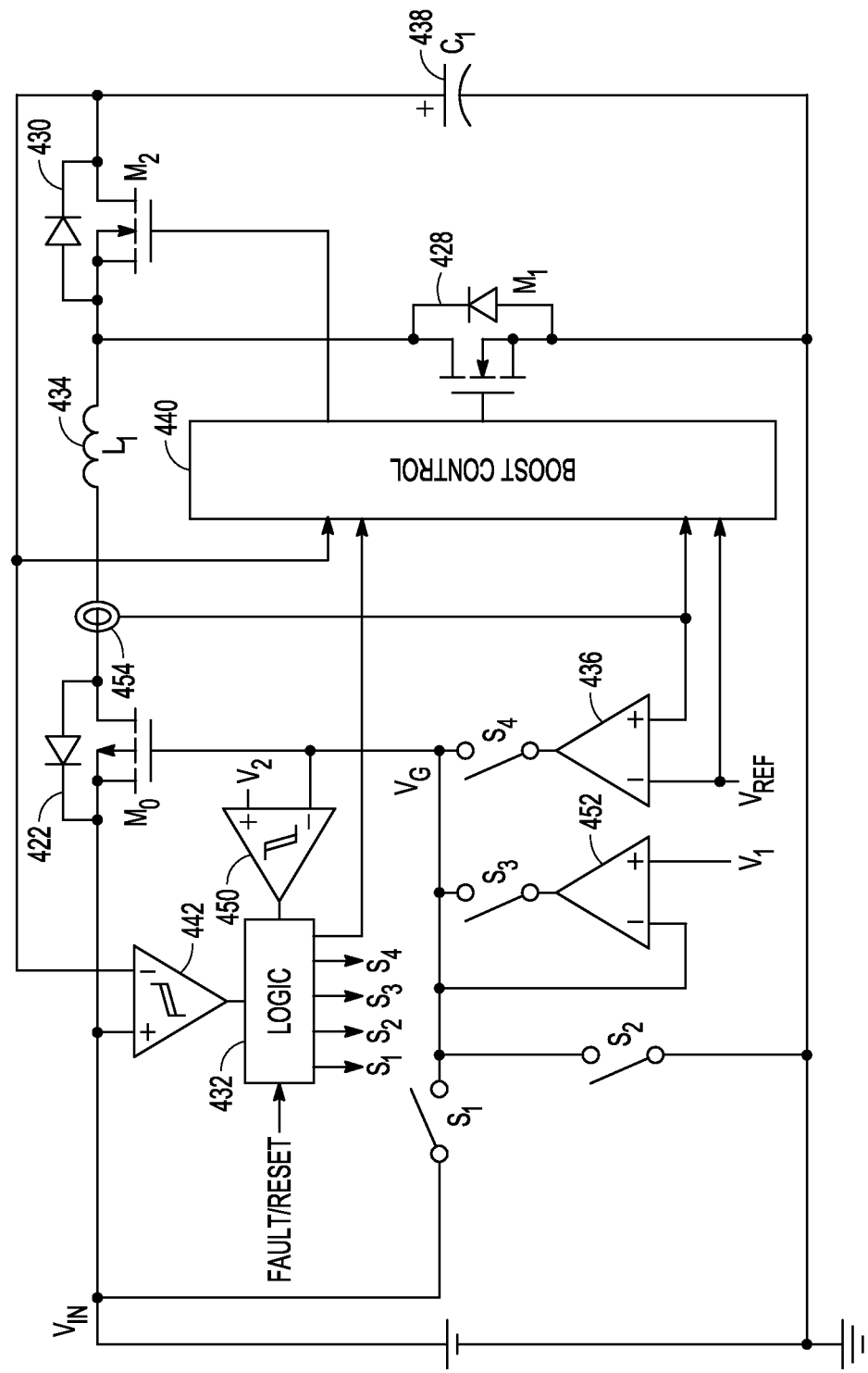
FIG. 4 is a circuit diagram of another example of a regulator circuit.

FIG. 4 is a circuit diagram of another example of a regulator circuit. The example in FIG. 4 includes more detail than the example of FIG. 3. The pass transistor $M_O$ is a PMOS transistor 422, and the boost converter circuit is a synchronous boost converter implemented with NMOS low side switch $M_1$ 428 and NMOS high side switch $M_2$ 430. High side switch $M_2$ can be a PMOS as well.

The control circuitry includes logic circuit block 432 that controls the operation of the hybrid linear-boost converter. The control logic of the logic circuit block 432 controls the states of switches $S_1$-$S_4$ and the boost controller 440. In the shutdown mode, or during a fault condition, the control logic activates switch $S_1$ to close switch $S_1$. This biases the pass transistor $M_O$ to deactivate the transistor and turn $M_O$ completely off to isolate the input $V_{IN}$ from the output $V_{OUT}$.

In the boost converter approach of FIG. 1, the output voltage cannot go to zero in shutdown mode, due to the body-diode of the top switch transistor. In contrast, the hybrid linear-boost converter of FIGS. 3 and 4 is capable of true shutdown, which significantly reduces system power consumption in standby. During a fault condition, it also isolates the input from the fault, which is not possible in the boost converter approach of FIG. 1.

Returning to FIG. 4, when the output voltage $V_{OUT}$ is lower than input voltage $V_{IN}$, the boost converter circuit alone cannot operate because the voltage-second balance cannot be established in the inductor 434 ($L_1$). In this condition ($V_{OUT}<V_{IN}$), the regulator circuit operates in linear regulator mode. The control logic closes switch $S_4$. The servo amplifier 436 is active, which biases the control input of $M_O$ to operate $M_O$ in the active/saturation region. The servo amplifier 436 regulates the drain current of $M_O$ to the target input current limit to slowly charge up the output capacitor 438 ($C_1$). Comparator 442 compares $V_{OUT}$ to $V_{IN}$ and provides the result of the comparison to the control logic. When $V_{OUT}<V_{IN}$, the control logic may command the boost controller 440 to operate either in shutdown or pass-through mode. In converter shutdown mode, the body diode of $M_2$ (or the rectification diode if a non-synchronous boost converter is used) conducts the current to the output capacitor $C_1$. $M_2$ can also constantly turn on to pass the current. In either case, the boost converter has no switching loss and only consumes an ultra-small standby current.

When the output voltage $V_{OUT}$ is much lower than the input voltage $V_{IN}$, the voltage drop across the pass transistor $M_O$ can be large. To limit the power dissipation on $M_O$, the linear regulating circuit can operate in the power foldback mode with reduced current limit, until the output voltage charges to a higher level.

When the output voltage $V_{OUT}$ is greater than input voltage $V_{IN}$, the boost converter circuit is activated, and the regulator circuit operates in a boost mode. In boost mode, transistors $M_1$ and $M_2$ are switching, so that the output voltage is regulated at a higher voltage than the input voltage. In this condition the control logic will close switch $S_2$ to pull the control input of $M_O$ to ground, so that pass transistor $M_O$ fully turns on to minimize the conduction loss. If the output voltage is lower than the target output voltage, the boost converter will charge the output capacitor with regulated input current in a constant-current mode. As soon as the output voltage reaches target level, the boost converter shifts to constant-voltage mode.

Table I summarizes the operation modes of the hybrid linear-boost converter, including shutdown mode, linear regulator mode, and boost mode, and the states of transistors $M_O$, $M_1$, and $M_2$ in the operation modes.

TABLE I

| Mode | Shutdown | Linear Regulator | Boost |
| --- | --- | --- | --- |
| Output Voltage | $V_{OUT} = 0$ | $V_{OUT} < V_{IN}$ | $V_{OUT} \geq V_{IN}$ |
| $M_O$ | off | Modulated to control current | Fully on for current sense |
| $M_1$ | off | 100% off | Switching |
| $M_2$ | off | 100% on | Switching |

Figure 5:
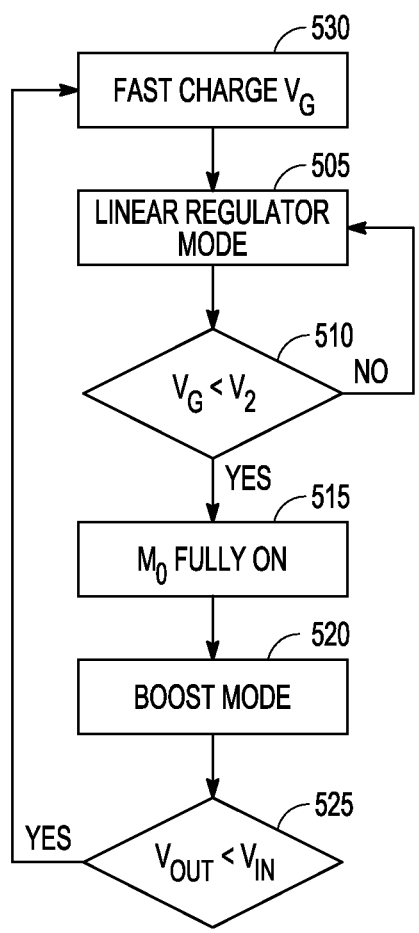
FIG. 5 is a flow diagram of an example of a method of operating a regulator circuit.

FIG. 5 is a flow diagram of an example of a method of operating a regulator circuit, such as the regulator circuit examples of FIGS. 3 and 4. The flow diagram shows the transitions between the linear regulator mode and the boost mode of the regulator circuit.

At block 505, the output voltage of the regulator circuit is less than the input voltage of the regulator circuit ($V_{OUT}<V_{IN}$). The regulator circuit operates in the linear regulator mode to regulate the input current to charge the output capacitor. $M_O$ operates in the active/saturation region in the linear regulator mode. Preferably, the size of $M_O$ is large, and its gate overdrive voltage should be relatively small. As the output voltage rises to approximately the input voltage, $M_O$ enters linear/triode operation region, causing the input current to drop. To correct the error, the servo amplifier 436 in FIG. 4 will continue to decrease the gate voltage $V_G$ of $M_0$.

At block 510, the control input (gate voltage $V_G$) to the pass transistor is monitored. In FIG. 4, comparator 450 monitors the gate voltage $V_G$ to see if it falls below the detection voltage $V_2$. When the comparator 450 detects that the source-gate voltage of $M_0$ meets $V_2$, the logic circuit block 432 will close switch $S_2$ to fully turn on $M_0$ at block 515. The regulator circuit enters boost mode at block 520 to regulate the output voltage. In the example of FIG. 4, the logic circuit block 432 opens switch $S_4$, disables the servo amplifier 436, and prompts the boost controller 440 to start operation of the boost circuit and switching of the $M_1$ and $M_2$ transistors. Performing mode transitions based on the gate voltage instead of the actual drain-source voltage of $M_0$ can be easier and more robust. The threshold voltage $V_2$ can be generated by the gate-source voltage of a PMOS transistor, which is in the same type as $M_0$, to further eliminate the process and temperature variation.

In the boost mode, the output voltage of the regulator circuit is greater than the input voltage of the regulator circuit. At block 525, the voltages $V_{IN}$ and $V_{OUT}$ are compared. When $V_{OUT}<V_{IN}$, the operation transitions back to the linear mode. At block 530, the output voltage of the regulator circuit is less than the input voltage of the regulator circuit ($V_{OUT}<V_{IN}$). The gate voltage $V_G$ of the pass transistor $M_0$ is charged so that the pass transistor $M_0$ can regulate the input current.

Returning to FIG. 4, the output voltage may become lower than the input voltage due to a pulsating load discharge that discharges the output capacitor $C_1$, or during a fault event where the output is shorted to a voltage less than the input voltage (e.g., shorted to circuit ground). As explained previously herein, if the boost converter circuit is operating with $V_{OUT}<V_{IN}$, the voltage-second of the inductor $L_1$ cannot be balanced, which can cause the inductor current to surge. To prevent this, the comparator 442 monitors the input voltage $V_{IN}$ and output voltage $V_{OUT}$. As soon as $V_{OUT}$ drops below $V_{IN}$, the control logic of the logic circuit block 432 will disable the boost controller 440. The logic circuit block 432 will close switch $S_4$ and activate the servo amplifier 436 immediately so that $M_0$ can limit the input current. Detecting $V_{OUT}$ may be more reliable than detecting the actual over current event, because detecting voltage across the inductor is essentially monitoring the slope of inductor current. The regulator circuit can switch to operating in the linear regulator mode even before the current accumulates to a high level.

As explained previously herein, it may be desired for the size of $M_0$ to be large. In this case, the gate capacitance of $M_0$ can be high, and the slew rate of $V_G$ may be limited by the speed of the servo amplifier 436. To speed up the transition from the boost mode to the linear regulator mode, the logic circuit block 432 will close switch $S_3$ for a short period of time (for example, a few micro-seconds) so that the buffer circuit 452 assists the slew rate of $V_G$ in rising to the level which is close to its final regulation point. Although it is not necessary to have the reference voltage $V_1$ to be at the exact end regulation point of $V_G$, reference voltage $V_1$ can be generated by the gate-source voltage of a PMOS transistor that matches the pass transistor $M_0$, to reduce the process and temperature variation.

To accurately regulate the input current, the regulator circuit includes a current sensing circuit 454. In a conventional boost converter as in FIG. 1, the current sensing element 104 is usually implemented as a discrete sensing resistor, which not only occupies extra space, but also dissipates power.

Figure 6:
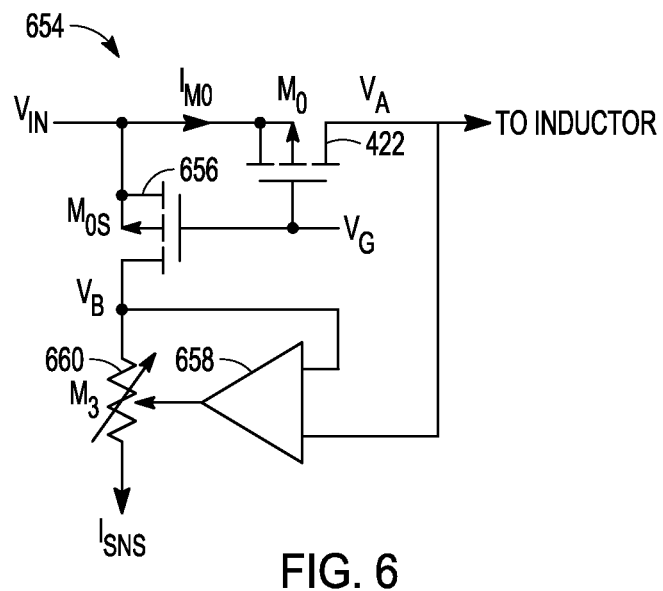
FIG. 6 is a circuit diagram of an integrated current sensing circuit.

FIG. 6 is a circuit diagram of an integrated current sensing circuit 654 that can be used as the current sensing circuits 354, 454 in FIGS. 3 and 4. The current sensing circuit 654 is fully integrated and the regulator circuit examples of FIGS. 3 and 4 do not need any external current sensing components. The input current is sensed through the PMOS passing transistor $M_0$ using PMOS sensing transistor $M_{OS}$ 656. The sensing transistor $M_{OS}$ is the same type of device and $M_0$. $M_{OS}$ has the same channel length as the passing transistor $M_0$, but a much smaller channel width. Transistor $M_{OS}$ shares the same gate and source connections as $M_0$. In the linear regulator mode of the regulator circuit, both $M_0$ and $M_{OS}$ operate in the active/saturation region. Therefore, the drain current of $M_{OS}$ is proportional to that in $M_0$:

$$I_{M0}:I_{SNS} = \left(\frac{W}{L}\right)_{M0} : \left(\frac{W}{L}\right)_{M0s},$$

where W and L are the widths and lengths of the channel region of the transistors, and $I_{M0}$ and $I_{SNS}$ are the drain currents of $M_0$ an $M_{OS}$, respectively. Thus, sensing transistor $M_{OS}$ provides a sensed current representative of the current in pass transistor $M_0$. $M_{OS}$ can be paced very close or even inside $M_0$ to minimize the process and temperature variation between them.

In the boost mode of the regulator circuit, pass transistor $M_0$ operates in the linear/triode region. The current sensing circuit 654 includes a clamping amplifier 658 and a transistor $M_3$ 660. The clamping amplifier 658 servos the transistor $M_3$ so that the inputs of clamping amplifier 658, the drain of $M_0$ ($V_A$) and the drain of MOS (VB), become equal. The transistor $M_3$ can be realized as either NMOS or PMOS, and the input polarity of the clamping amplifier 658 are be adjusted accordingly. When the clamping amplifier 658 clamps the drain voltage of the sense transistor $M_{OS}$ to the drain voltage of the pass transistor $M_0$ (or $V_A=V_B$), $M_{OS}$ has the same gate, source, and drain voltages as those of $M_0$, so that the drain current relational equation above holds for the boost mode as well as the linear regulator mode.

Figure 7:
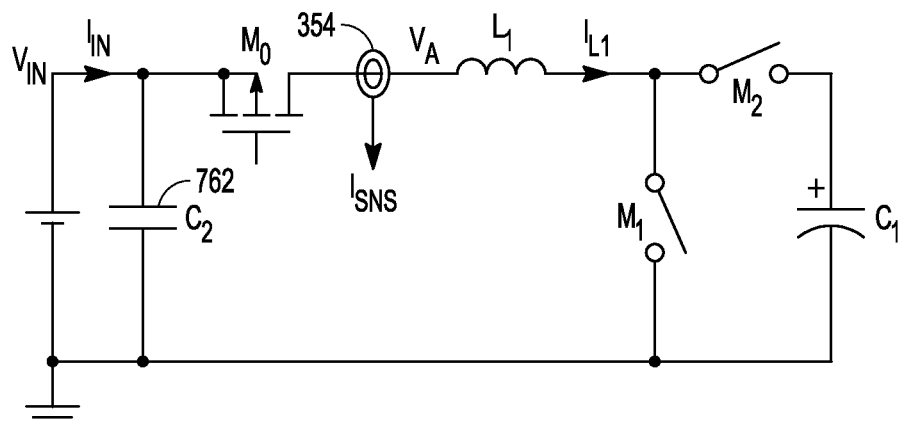
FIGS. 7 and 8 are circuit diagrams of further examples of regulator circuits.

FIG. 7 is a circuit diagram of another example of a regulator circuit. A small input capacitor 762 ($C_2$) is added to filter the ripple of the inductor current $I_{L1}$. In FIG. 7, the input capacitor $C_2$ is placed at the input node before the pass transistor $M_0$. In this configuration the sensed current Isms from the current sensing circuit 354 is proportional to the inductor current $I_{L1}$, whose level equals to input current $I_{IN}$ in steady state. A benefit of this configuration is that the Isms signal may also be used in the boost controller to control the inductor current $I_{L1}$. The boost converter circuit can operate in either peak current mode, valley current mode, or average current mode control. There is no need for additional current sense circuitry in the boost converter circuit to control the inductor current.

Figure 8:
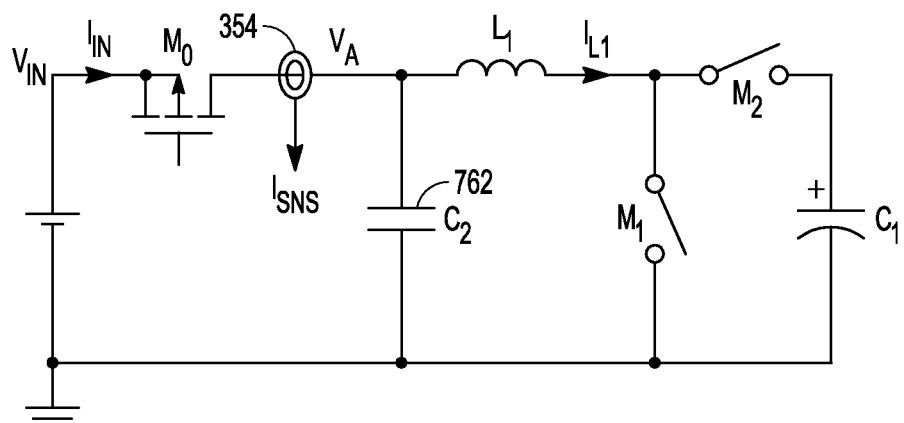

FIG. 8 is a circuit diagram of another example of a regulator circuit. In FIG. 7, the input capacitor $C_2$ is connected to a circuit node between the pass transistor $M_0$ and the inductor $L_1$. One end of the input capacitor $C_2$ sees the voltage VA of the drain of the pass transistor $M_0$. In this configuration, the current sense signal $I_{SNS}$ is exactly proportional to $I_{IN}$, and the sensed current $I_{SNS}$ is a more accurate representation of the input current $I_{IN}$ than the configuration of FIG. 7. Also, in this configuration the pass transistor $M_0$ can regulate the inrush current through $C_2$ when the input source is abruptly connected (hot plug). The configuration can also protect the input source from any failure on the input capacitor $C_2$. The tradeoff of this configuration is that the boost converter circuit may need extra sensing circuitry to control the inductor current $I_{L1}$.

Figure 9:
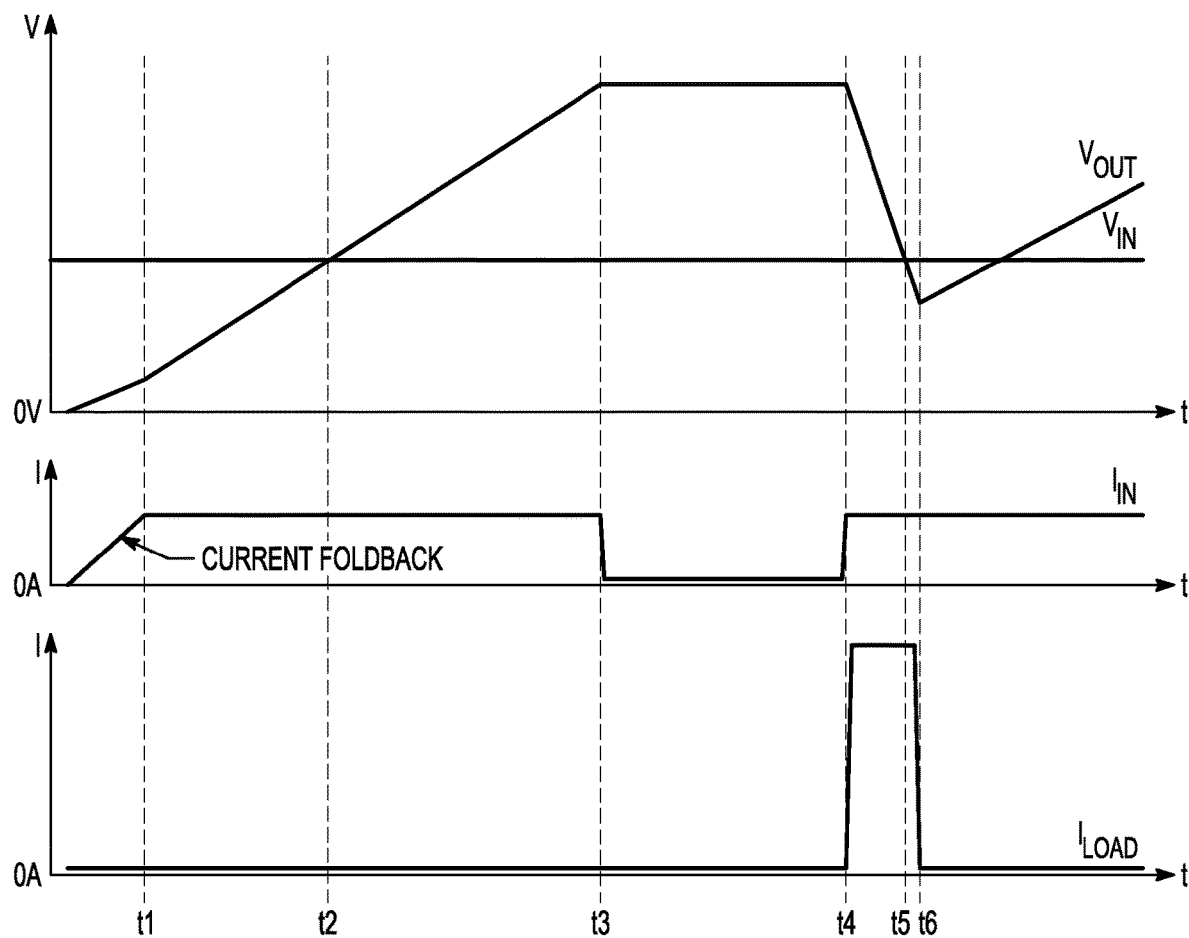
FIG. 9 is a waveform of an example application of a regulator circuit.

FIG. 9 is an illustration of a simplified waveform of an example application of a regulator circuit (e.g., a regulator circuit as shown in FIGS. 3 and 4). $V_{IN}$ is the input voltage, $I_{IN}$ is the input current to the regulator circuit, $V_{OUT}$ is the output voltage, and load is the load current.

Before time t2, the regulator circuit operates in the constant-current control linear regulator mode. To reduce the power consumption on the pass transistor $M_0$, when $V_{OUT}$ is very low (before time t1), the regulator circuit operates in power foldback with a lower current limit. As $V_{OUT}$ rises sufficiently high, the regulator circuit operates within the current limit. When $V_G$ of the pass transistor reaches detection voltage $V_2$ (see FIG. 4) at time t2 (indicating $V_{OUT}$ is nearing $V_{IN}$), the regulator circuit smoothly transits to boost mode. From time t2 to time t3, the regulator circuit operates in constant-current control boost regulation mode, charging output voltage $V_{OUT}$ towards its regulated target voltage. At time t3, $V_{OUT}$ reaches the target regulated voltage, and the regulator circuit operates in constant-voltage control boost regulation mode.

At time t4, the output capacitor is discharged by the load current $I_{LOAD}$, $V_{OUT}$ decreases below the regulation target voltage, and the regulator circuit operates in constant-current control boost regulation mode. At time t5, $V_{OUT}$ drops below the $V_{IN}$, and the regulator circuit operates in constant-current control linear regulation mode. At time t6, the output discharging completes and LOAD drops to 0A. The output capacitor charging process repeats.

The regulator circuits described herein have a hybrid linear-boost converter circuit topology. A pass transistor is added to a boost converter. When output voltage is lower than input voltage, the hybrid linear-boost converter operates in a linear regulator mode with continuous input current. When the output voltage is equal to or higher than input voltage, the hybrid linear-boost converter operates in a boost mode with the pass transistor fully turned on to minimize the conduction loss. The pass transistor serves as the current sensing element in both the linear regulator mode and the boost mode for a highly integrated solution. The pass transistor can also be fully turned off to disconnect the output from the input in shutdown or during fault conditions. The mode transition mechanism between the linear mode and the boost mode is simple, fast, and resilient.

ADDITIONAL DESCRIPTION AND ASPECTS

A first Aspect (Aspect 1) includes subject matter (such as a regulator circuit) comprising a linear input current regulating circuit configured to regulate input current to the regulator circuit when an output voltage of the regulator circuit is less than an input voltage of the regulator circuit, and a switching regulating circuit configured to regulate the input current when the output voltage is greater than the input voltage and less than a target regulated output voltage and regulate the output voltage when the output voltage reaches the target regulated output voltage.

In Aspect 2, the subject matter of Aspect 1 optionally includes a boost converter circuit that includes an inductor, and a linear current regulating circuit that includes a pass transistor connected between an input terminal of the regulator circuit and the inductor.

In Aspect 3, the subject matter of Aspect 2 optionally includes a control circuit. The control circuit is configured to bias the pass transistor in an active/saturation region when the output voltage is less than the input voltage and the regulator circuit is in a charging mode, bias the pass transistor in a linear/triode region when the output voltage is greater than the input voltage and the regulator circuit is in either the charging mode or a constant-voltage mode, and deactivate the pass transistor to disconnect the input voltage from the regulator circuit in a shutdown mode.

In Aspect 4, the subject matter of one or both of Aspects 2 and 3 optionally includes a servo amplifier coupled to a control input of the pass transistor, and a current sensing circuit configured to provide a sensed current signal, that is sensed in the pass transistor, to the servo amplifier.

In Aspect 5, the subject matter of Aspect 4 optionally includes a switching regulator circuit configured to control the input current using the sensed current signal.

In Aspect 6, the subject matter of one or both of Aspects 4 and 5 optionally includes an input capacitor coupled to a circuit node between the pass transistor and the inductor, and a current sensing circuit configured to provide a sensed inductor current to the servo amplifier.

In Aspect 7, the subject matter of one or any combination of Aspects 4-6 optionally includes an input capacitor coupled to an input circuit node of the regulator circuit and the pass transistor; and wherein the current sensing circuit is configured to provide a sensed input current to the servo amplifier and control circuitry of the boost converter circuit.

In Aspect 8, the subject matter of one or any combination of Aspects 4-7 optionally includes a clamping amplifier coupled to the pass transistor and the sense transistor, a current sensing circuit that includes a sense transistor including a control input coupled to the control input of the pass transistor, and the pass transistor and the sense transistor are field effect transistors (FETs), and a pass transistor biased in an active/saturation region when the output voltage is less than the input voltage, and biased in a linear/triode region when the output voltage is greater than the input voltage. Current in the sense transistor is proportional to the current in the pass transistor when the pass transistor is biased in either of the active/saturation region or the linear/triode region, and the clamping amplifier clamps the drain voltage of the sense transistor to the drain voltage of the pass transistor when the pass transistor operates in the linear/triode region.

In Aspect 9, the subject matter of one or any combination of Aspects 2-8 optionally includes a slew rate assistance buffer circuit coupled to a control input of the pass transistor. The boost converter circuit regulates the output voltage when the regulator circuit is in a boost mode, and the pass transistor regulates the input current when the regulator circuit is in a linear regulating mode. The slew rate assistance buffer circuit is active during a transition from the boost mode to the linear regulating mode to drive the control input of the pass transistor.

Aspect 10 includes subject matter (such as a method of operating a regulator circuit) or can optionally be combined with one or any combination of Examples 1-9 to include such subject matter, comprising operating the regulator circuit in a linear regulator mode that regulates input current to the regulator circuit when an output voltage of the regulator circuit is less than an input voltage of the regulator circuit, transitioning the regulator circuit to a boost converter mode that regulates the input current when the output voltage is greater than the input voltage and lower than a target regulated output voltage, and regulates the output voltage when the output voltage reaches the target regulated output voltage, and transitioning the regulator circuit back to the linear regulator mode when the output voltage of the regulator circuit decreases to less than the input voltage of the regulator circuit.

In Aspect 11, the subject matter of Aspect 10 optionally includes charging an output capacitor coupled to the regulator circuit using the regulated input current, transitioning the regulator circuit to the boost converter mode when the voltage of the output capacitor reaches a threshold voltage, and transitioning the regulator circuit back to the linear regulator mode in response to discharge of the output capacitor.

In Aspect 12, the subject matter of one or both of Aspects 10 and 11 optionally include regulating the input current in the linear regulator mode using a pass transistor and monitoring a voltage of a control input of the pass transistor, and activating a boost converter circuit of the regulator circuit when a control voltage of the pass transistor meets a specified detection voltage indicating that the pass transistor is entering the linear/triode region and that the output voltage is nearing the input voltage.

In Aspect 13, the subject matter of one or any combination of Aspects 1-12 optionally includes monitoring the output voltage and the input voltage and transitioning the regulator circuit back to the linear regulator mode when the output voltage falls below the input voltage. The transitioning includes deactivating the switching regulator and activating the linear regulate to regulate the input current.

In Aspect 14, the subject matter of Aspect 13 optionally includes activating a drive circuit coupled to the control input of the pass transistor for a predetermined time duration when transitioning the regulator circuit back to the linear regulator mode from the boost converter mode.

In Aspect 15, the subject matter of one or any combination of Aspects 10-14 optionally includes sensing current in the pass transistor to regulate the input current.

In Aspect 16, the subject matter of one or any combination of Aspects 10-15 optionally includes regulating the input current to the regulator circuit using a pass transistor in the linear regulator mode and deactivating the pass transistor to disconnect an input of the regulator circuit from an output of the regulator circuit in a shutdown mode.

Aspect 17 includes subject matter (such as a charging circuit) or can optionally be combined with one or any combination of Aspects 1-16 to include such subject matter, comprising an output capacitor, a linear input current regulating circuit configured to regulate input current to the charging circuit when the voltage of the output capacitor is less than the input voltage of the charging circuit, and a switching regulating circuit configured to regulate the input current when the output voltage is greater than the input voltage and lower than a target regulated output voltage, and regulate the output voltage when the output voltage reaches the target regulated output voltage.

In Aspect 18, the subject matter of Aspect 17 optionally includes a switching regulating circuit including a boost converter circuit that includes an inductor. The linear input current regulating circuit optionally includes a pass transistor connected between an input terminal of the charging circuit and the inductor.

In Aspect 19, the subject matter of Aspect 18 optionally includes a control circuit. The control circuit is configured to bias the pass transistor in an active-saturation region when the voltage of the output capacitor is less than the input voltage and the charging circuit is in a charging mode, bias the pass transistor in a linear region when the voltage of the output capacitor is greater than the input voltage of the charging circuit and the charging circuit is in either the charging mode or a constant-voltage mode, and deactivate the pass transistor to disconnect the input voltage from the regulator circuit in a shutdown mode.

In Aspect 20, the subject matter of one or both of Aspects 18 and 19 optionally includes a servo amplifier coupled to a control input of the pass transistor, and a current sensing circuit configured to provide, to the servo amplifier, a sensed current signal that is sensed in the pass transistor and used by the boost converter circuit for input current control.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A regulator circuit comprising:
a pass transistor configured to linearly regulate input current to the regulator circuit when an output voltage of the regulator circuit is less than an input voltage of the regulator circuit; and
a switching regulating circuit configured to regulate the input current when the output voltage is greater than the input voltage and less than a target regulated output voltage and regulate the output voltage when the output voltage reaches the target regulated output voltage, wherein the pass transistor is connected between an input terminal of the regulator circuit and the switch regulating circuit.

2. The regulator circuit of claim 1,
wherein the switching regulating circuit includes a boost converter circuit that includes an inductor; and
wherein the pass transistor is connected between the input terminal of the regulator circuit and the inductor.

3. The regulator circuit of claim 2, including a control circuit configured to:
bias the pass transistor in an active/saturation region when the output voltage is less than the input voltage and the regulator circuit is in a charging mode;
bias the pass transistor in a linear/triode region when the output voltage is greater than the input voltage and the regulator circuit is in either the charging mode or a constant-voltage mode; and
deactivate the pass transistor to disconnect the input voltage from the regulator circuit in a shutdown mode.

4. The regulator circuit of claim 2, including:
a servo amplifier coupled to a control input of the pass transistor; and
a current sensing circuit configured to provide a sensed current signal, that is sensed in the pass transistor, to the servo amplifier.

5. The regulator circuit of claim 4, wherein the switching regulator circuit is configured to control the input current using the sensed current signal.

6. The regulator circuit of claim 4, including an input capacitor coupled to a circuit node between the pass transistor and the inductor; and
wherein the current sensing circuit is configured to provide a sensed inductor current to the servo amplifier.

7. The regulator circuit of claim 4, including an input capacitor coupled to an input circuit node of the regulator circuit and the pass transistor; and wherein the current sensing circuit is configured to provide a sensed input current to the servo amplifier and control circuitry of the boost converter circuit.

8. The regulator circuit of claim 4, including:
a clamping amplifier coupled to the pass transistor and the sense transistor;
wherein the current sensing circuit includes a sense transistor including a control input coupled to the control input of the pass transistor, and the pass transistor and the sense transistor are field effect transistors (FETs);
wherein the pass transistor is biased in an active/saturation region when the output voltage is less than the input voltage, and biased in a linear/triode region when the output voltage is greater than the input voltage;
wherein current in the sense transistor is proportional to the current in the pass transistor when the pass transistor is biased in either of the active/saturation region or the linear/triode region; and wherein the clamping amplifier clamps the drain voltage of the sense transistor to the drain voltage of the pass transistor when the pass transistor operates in the linear/triode region.

9. The regulator circuit of claim 2, including:
a slew rate assistance buffer circuit coupled to a control input of the pass transistor;
wherein the boost converter circuit regulates the output voltage when the regulator circuit is in a boost mode;
wherein the pass transistor regulates the input current when the regulator circuit is in a linear regulating mode; and
wherein the slew rate assistance buffer circuit is active during a transition from the boost mode to the linear regulating mode to drive the control input of the pass transistor.

10. A method of operating a regulator circuit, the method comprising:
operating the regulator circuit in a linear regulator mode using a pass transistor that linearly regulates input current to the regulator circuit when an output voltage of the regulator circuit is less than an input voltage of the regulator circuit, wherein the pass transistor is connected to an input of the regulator circuit;
transitioning the regulator circuit to a boost converter mode that regulates the input current when the output voltage is greater than the input voltage and lower than a target regulated output voltage, and regulates the output voltage when the output voltage reaches the target regulated output voltage; and
transitioning the regulator circuit back to the linear regulator mode when the output voltage of the regulator circuit decreases to less than the input voltage of the regulator circuit.

11. The method of claim 10, including:
charging an output capacitor coupled to the regulator circuit using the regulated input current;
transitioning the regulator circuit to the boost converter mode when the voltage of the output capacitor reaches a threshold voltage; and
transitioning the regulator circuit back to the linear regulator mode in response to discharge of the output capacitor.

12. The method of claim 10,
wherein the operating the regulator circuit in a linear regulator mode includes regulating the input current in the linear regulator mode using the pass transistor and monitoring a voltage of a control input of the pass transistor; and
wherein the transitioning the regulator circuit to the boost converter mode includes activating a boost converter circuit of the regulator circuit when a control voltage of the pass transistor meets a specified detection voltage indicating that the pass transistor is entering the linear/triode region and that the output voltage is nearing the input voltage.

13. The method of claim 10, including:
monitoring the output voltage and the input voltage; and
transitioning the regulator circuit back to the linear regulator mode when the output voltage falls below the input voltage, including deactivating a switching regulator and activating the linear regulator mode to regulate the input current.

14. The method of claim 13, wherein transitioning the regulator circuit back to the linear regulator mode includes activating a drive circuit coupled to the control input of the pass transistor for a predetermined time duration when transitioning the regulator circuit back to the linear regulator mode from the boost converter mode.

15. The method of claim 10, wherein regulating the input current includes sensing current in the pass transistor to regulate the input current.

16. The method of claim 10, including:
regulating the input current to the regulator circuit using the pass transistor in the linear regulator mode; and
deactivating the pass transistor to disconnect an input of the regulator circuit from an output of the regulator circuit in a shutdown mode.

17. A charging circuit, the circuit comprising:
an output capacitor;
a pass transistor configured to linearly regulate input current to the charging circuit when the voltage of the output capacitor is less than the input voltage of the charging circuit; and
a switching regulating circuit configured to regulate the input current when the output voltage is greater than the input voltage and lower than a target regulated output voltage, and regulate the output voltage when the output voltage reaches the target regulated output voltage, wherein the pass transistor is connected between an input terminal of the regulator circuit and the switch regulating circuit.

18. The charging circuit of claim 17,
wherein the switching regulating circuit includes a boost converter circuit that includes an inductor; and
wherein the pass transistor is connected between an input terminal of the charging circuit and the inductor.

19. The charging circuit of claim 18, including a control circuit configured to:
bias the pass transistor in an active-saturation region when the voltage of the output capacitor is less than the input voltage and the charging circuit is in a charging mode;
bias the pass transistor in a linear region when the voltage of the output capacitor is greater than the input voltage of the charging circuit and the charging circuit is in either the charging mode or a constant-voltage mode; and
deactivate the pass transistor to disconnect the input voltage from the regulator circuit in a shutdown mode.

20. The charging circuit of claim 18, including:
a servo amplifier coupled to a control input of the pass transistor; and
a current sensing circuit configured to provide, to the servo amplifier, a sensed current signal that is sensed in the pass transistor and used by the boost converter circuit for input current control.

* * * * *